United States Patent
Griffith et al.

(10) Patent No.: US 6,272,347 B1
(45) Date of Patent: Aug. 7, 2001

(54) AUTOMATIC CALL DISTRIBUTION BASED ON PHYSICAL LOCATION OF WIRELESS TERMINALS

(75) Inventors: Gary L. Griffith, Arvada; Thomas C. Hanson; Kenneth J. Roberge, both of Boulder, all of CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 08/941,792

(22) Filed: Sep. 30, 1997

(51) Int. Cl.[7] ............................... H04Q 7/20; H04M 3/00
(52) U.S. Cl. ...................... 455/445; 455/456; 379/265.12
(58) Field of Search ......................... 455/445, 456, 455/560, 417; 379/265, 224, 266, 309, 210, 258, 259, 260, 261, 263, 264, 214, 306, 102.06

(56) References Cited

U.S. PATENT DOCUMENTS

| Re. 34,496 | * | 1/1994 | Franklin et al. | 455/574 |
|---|---|---|---|---|
| 4,016,540 | * | 4/1977 | Hyatt | 379/909 |
| 4,788,711 | * | 11/1988 | Nasco, Jr. | 455/574 |
| 5,377,256 | * | 12/1994 | Franklin et al. | 455/574 |
| 5,396,542 | * | 3/1995 | Alger et al. | 379/210 |
| 5,432,840 | | 7/1995 | Ryden | 379/58 |
| 5,465,286 | * | 11/1995 | Clare et al. | 379/265 |
| 5,768,360 | * | 6/1998 | Reynolds et al. | 379/265 |
| 5,787,359 | * | 7/1998 | Nagata | 455/433 |
| 5,815,565 | * | 9/1998 | Doremus et al. | 379/265 |
| 5,818,909 | * | 10/1998 | Van Berkum et al. | 379/265 |
| 5,825,869 | * | 10/1998 | Brooks et al. | 379/265 |
| 5,828,747 | * | 10/1998 | Fisher et al. | 379/265 |
| 5,832,059 | * | 11/1998 | Aldred et al. | 379/265 |
| 5,841,854 | * | 11/1998 | Schumacher et al. | 379/224 |
| 5,862,208 | * | 1/1999 | MeLampy et al. | 379/224 |
| 5,914,951 | * | 6/1999 | Bentley et al. | 379/265 |

OTHER PUBLICATIONS

Harvey, D. E. et al., "Call Center Solutions," AT&T Technical Journal, vol. 70, No. 5, Sep. 1991, pp. 36–44.
Derville, D. et al., "Call Centers: A Strategic Issue for Both Customers and SUppliers," Alcatel Telecommunications Review, Oct. 1996, pp. 275–283.

* cited by examiner

Primary Examiner—Nguyen T. Vo
(74) Attorney, Agent, or Firm—John C. Moran (57) ABSTRACT

Providing by a telecommunication switching system an automatic call distribution function using agents having wireless terminals by determining the location of the agents, determining the agents' skills, and routing calls to agents based on their physical location and the agents' skills. The telecommunication switching system determines the location of particular agents based on information obtained from wireless base stations. In addition, the telecommunication switching system transmits to the agent, who has been selected to help, the location where the agent is to go. This notification can be done utilizing a display on the wireless terminal or by using an audio message to the agent. Also, if an individual needing help goes off hook on a special wired telephone connected to the telecommunication switching system, the telecommunication switching system determines the location of the wired telephone and selects an agent who is then directed to the location of the wired telephone.

19 Claims, 8 Drawing Sheets

AUTOMATIC CALL DISTRIBUTION BASED ON PHYSICAL LOCATION OF WIRELESS TERMINALS

TECHNICAL FIELD

This invention relates to automatic call distribution systems utilizing wireless terminals.

BACKGROUND OF THE INVENTION

Within the prior art, automatic call distribution (ACD) systems route calls to agents based on pre-administered data such as particular expertise of an agent and/or dynamic information such as the length of time an agent has been idle. The prior art methods of determining which agents to route calls to is particularly well suited for call centers that are performing a catalog ordering service or answering financial type questions. In these types of applications for call centers, the location of the agent and necessary information are not factors since they are fixed or known. In general, the agents work fixed shifts and during these shifts they are at a designated call center terminal. Hence, once an agent is selected based on pre-administered data, an incoming call can be easily routed to the selected agent. The information needed by the agent is provided from a computer data base to the designated call center terminal.

Whereas the prior art call distribution systems have worked well for the traditional call center, there are many situations where the prior art automatic call distribution systems do not function well. In non-traditional call center applications, the agents are mobile, and the information that is needed by the agent is not present within a computer data base, but rather, physical objects must be inspected in order to determine the actual information. One example is a retail store such as a large hardware store. In such a situation, certain employees do have specific skills, e.g., plumbing; however, because of the nature of the business, a particular employee may not be present in the area of the store when information is needed to answer a customer call. For example, a customer may call wanting to know if a particular item is available and obtain a physical description of the item. This requires a store employee to physically go to a shelf, to examine the number of units available and to describe to the customer the physical appearance of the item. The customer may need expert advice in how to use the particular item, or the customer may simply need to know the physical description.

Another example of non-traditional call center applications is a hospital. When a call is received within a hospital for nurse assistance for a particular patient, it is highly desirable that the call be routed to a nurse who is familiar with the patient or who is located in close proximity to the patient.

SUMMARY OF THE INVENTION

This invention is directed to solving these problems and other disadvantages of prior art. In accordance with the invention, using agents having wireless terminals, a telecommunication switching system provides an automatic call distribution function by determining the location of the agents, the agents' skills, and routes calls to agents based on their physical location and the agents' skills. Advantageously, the telecommunication switching system determines the location of particular agents based on information obtained from wireless base stations.

In addition, the telecommunication switching system transmits to the agent, who has been selected to help, the location where the agent is to go. This notification can be done utilizing a display on the wireless terminal or by using an audio message to the agent. Also, if an individual needing help goes off hook on a wired telephone, the telecommunication switching system determines the location of the wired telephone and selects an agent who is then directed to the location of the wired telephone. In a retail store, it is a customer going off hook on a wired help telephone which causes the telecommunications switching system to direct an agent to the location of the customer. Within a hospital, a patient going off hook on a wired telephone within their room causes the telecommunication switching system to first attempt to contact the patient's nurse. Failing to contact the patient's nurse, the telecommunication switching system then attempts to select other nurses or hospital personnel that had been designated to provide backup assistance for the patient's nurse. This selecting could be done automatically when the patient goes off hook, or could be done after a central location or automatic attendant system determines the needs of the patient.

Other and further aspects of the present invention will become apparent during the course of the following description and by reference to the accompanying drawing.

DETAILED DESCRIPTION

Figure 1:
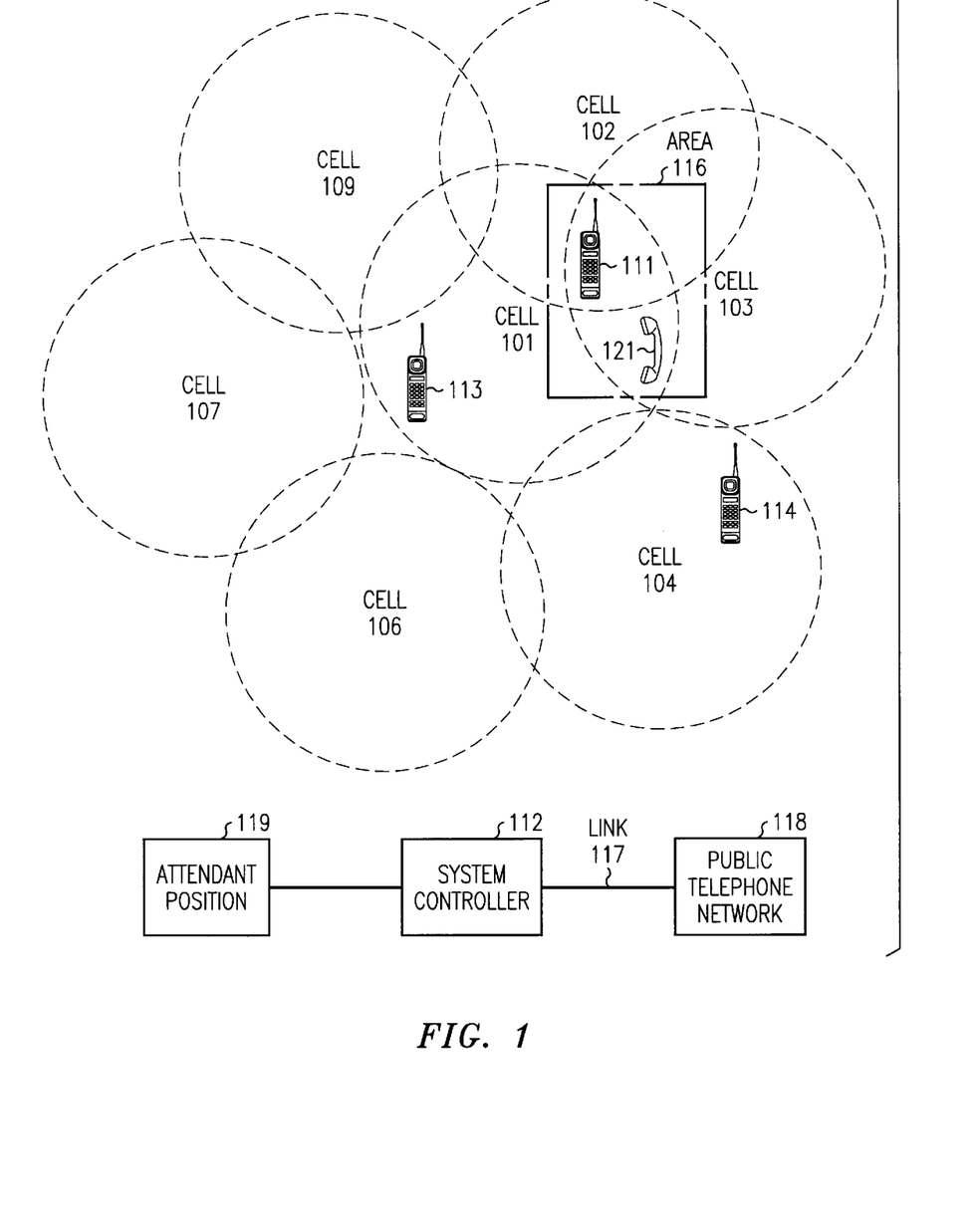
FIG. 1 illustrates a wireless telecommunication switching system embodying the inventive concept.

FIG. 1 illustrates a telecommunication switching system having a plurality of wireless cells (also referred to as cell sites) which are cells 101–109. These cells are providing service for wireless handsets such as wireless handsets 111, 113, and 114. Each cell consists of a base station that is not illustrated in FIG. 1 but is illustrated in detail in FIG. 2. The cells illustrated in FIG. 1 are under control of system controller 112. The geographical area covered by the cells is illustrated as being a circle; however, one skilled in the art would immediately recognize that the geographical area covered by each cell could be of a different configuration. System controller 112 controls the operation of the cells by controlling the base stations via communication links that are not illustrated in FIG. 1.

To understand the operation of the telecommunication switching system of FIG. 1 in providing automatic call distribution functions in accordance with the invention, consider the following example. System controller 112 utilizes the base station in cells 101–109 to determine the geographical position of each wireless handset within the area serviced by the telecommunication system. One skilled in the art would immediately recognize that the functions performed by system controller 112 in determining the geographical positions could be performed by an separate computer interconnected to system controller 112. Each base station can maintain adequate communication service with any wireless handset within its designated cell site. However, a base station also receives transmitted signals from wireless handsets outside of its designated cell and can measure the strength of these transmitted signals. For example, wireless handset 113 can only be adequately serviced by the base station of cell 101, but cells 107, 106, and 104 receive the transmitted signal from wireless handset 113. The strength of these received signals is utilized by system controller 112 to determine the position of wireless handset 113 within cell 101.

The telecommunication system of FIG. 1 may be utilized to provide communication for employees of a large hardware store. The communication channels are utilized for employees to contact each other and more importantly so that customers calling from public network 118 can receive information from employees (also referred to as agents) within the hardware store. The hardware store is physically divided into various departments. For example, area 116 represents the physical area that is occupied by the department selling tools. As illustrated in FIG. 1, portions of area 116 are serviced by cells 101–103.

If a customer calls the hardware store via public network 118, the customer's call is transferred to attendant position 119. Attendant position 119 can be serviced by a person or by an automated attendant computer. Regardless, attendant position 119 interrogates the customer to determine what department can assist them and also the level of skill that is required by the employee within the determined department. For example, within the tool department, the customer may simply wish to know sizes of available drill bits, or the customer may need expert assistance in purchasing a power tool. As illustrated in FIG. 1, wireless handset 111 is located within the tool department area 116. If the user of wireless handset 111 is available and has the necessary skills, the customer's call is transferred to wireless handset 111. On the other hand, if the user of wireless handset 111 does not have the necessary skill or is busy and the user of wireless handset 113 can assist the customer, the customer's call is transferred to wireless handset 113. The user of wireless handset 113 then walks in to area 116 in order to assist the customer. Note, that the telecommunication system of FIG. 1 is advantageously a personal communication service (PCS) system, and the cell sites have a radius of approximately 100 to 200 feet. Hence, the user of wireless handset 113 can easily walk into area 116 in order to assist the customer.

In addition, to providing service for wireless handsets, the telecommunication system of FIG. 1 also provides service to wired telephone handsets such as wired telephone handset 121. Distributed throughout the retail store are wired telephone handsets which are labeled as help telephones. System controller 112 knows the physical location of each of these wired telephones based on information entered by the telecommunication administrator of system controller 112. If a customer goes off hook on wired telephone handset 121 which is a help telephone, system controller 112 determines which agent should handle this customer. System controller 112 then directs the agent to the appropriate physical location which in this case would be area 116.

In addition to contacting an agent when it is necessary to assist a customer, system controller transmits information to the agent designating where the customer is located. This information can be transmitted utilizing the wireless display of the agent's wireless handset or the voice capabilities of the attendant position 119 can be utilized to direct the agent.

In addition to directing incoming calls from public network 118 to employees, system controller 118 also maintains information concerning the number of employees and the employee's skill levels in each of the areas of the store. This information then can be utilized by the manager of the hardware store to determine if there are sufficient employees in each of the store locations within the store. In addition, the manager can determine if there is the proper balance of expertise in the various areas.

To further understand the operation of the telecommunication switching system of FIG. 1 in providing automatic call distribution functions in accordance with the invention, consider the following second example. In this example, the telecommunication switching system is providing service within a hospital. One problem faced by hospitals is that often calls are directed to the nurses who are responsible for a particular patient. In general, one nurse has primary responsibility for a patient but other nurses on the floor also have information and knowledge of the patient. When a call is received by attendant position 119 for a nurse of a particular patient, system controller 112 is responsive to a request from attendant position 119 to determine the location of the primary nurse for the patient. If the primary nurse is not available on the patient's floor or is not present in the hospital, system controller 112 utilizes a special call coverage path which lists the nurses who have knowledge of this particular patient. Based on the call coverage path and the location of the nurses, system controller 112 directs the call to the nurse who is located in the closest proximity to the patient and who has knowledge of the patient. If the primary nurse is busy but close to the patient, the nurse can actuate the send-all call button on their wireless set and system controller 112 automatically routes the call to the next available nurse in the call coverage path.

Figure 2:
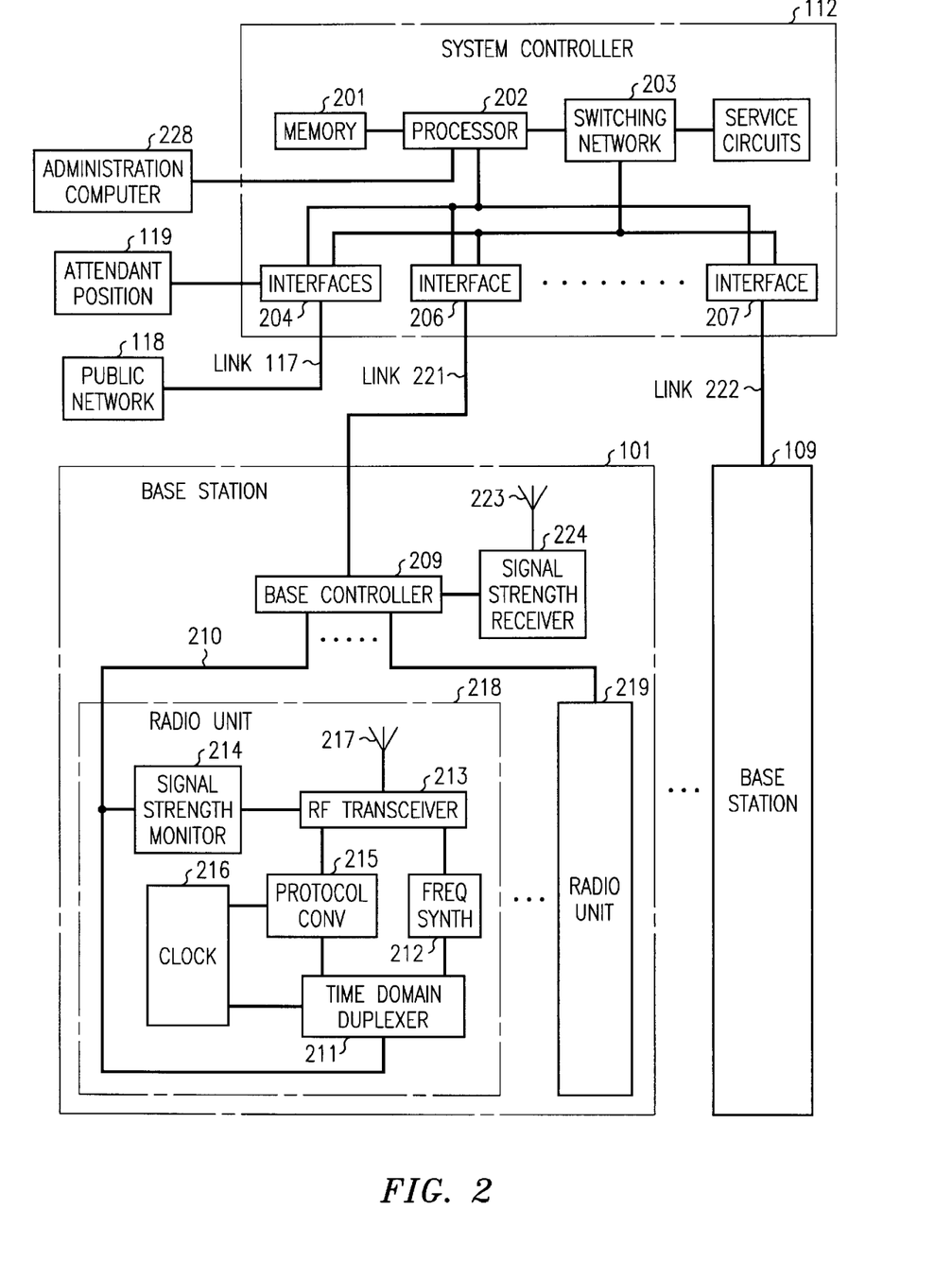
FIG. 2 illustrates, in block diagram form, the wireless telecommunication switching system of FIG. 1.

FIG. 2 illustrates, in block diagram form, the wireless telecommunication system illustrated in FIG. 1. System controller 112 is under the control of processor 202 which executes programs and utilizes data stored in memory 201. System controller 112 interfaces to public network 208 via interfaces 204. System controller 112 is interconnected to base stations 101–109 via links 221–222 which terminate on interfaces 206–207. The switching of audio and data received via interfaces 206–207 is performed by switching network 203 under control of processor 202. Base station 101 illustrates in greater detail the composition of a base station. Each base station comprises a plurality of radio units 218–219 that are under the control of base controller 209.

In a first embodiment of the invention, processor 202 is responsive to the information from each single strength monitor, such as single strength monitor 214 of radio unit 218, to determine the position of each of the active wireless handsets within the area serviced by the wireless communication system. Processor 202 maintains this information in a table in memory 201.

In a second embodiment of the invention, signal strength receiver 224 utilizing attendant 223 determines the transmission strength of each of the active wireless handsets within the area serviced by wireless communication system and transmits this information to processor 202 via base controller 209, link 221, and interface 206. Processor 202 is responsive to this information to implement the location process set forth in U.S. Pat. No. 5,327,144 which is hereby incorporated by reference.

In a third embodiment, each wireless handset has a global positioning satellite (GPS) receiver. In response to messages from processor 202, each wireless handset will report the coordinates determined by the GPS receiver via base station 101.

Figure 3:
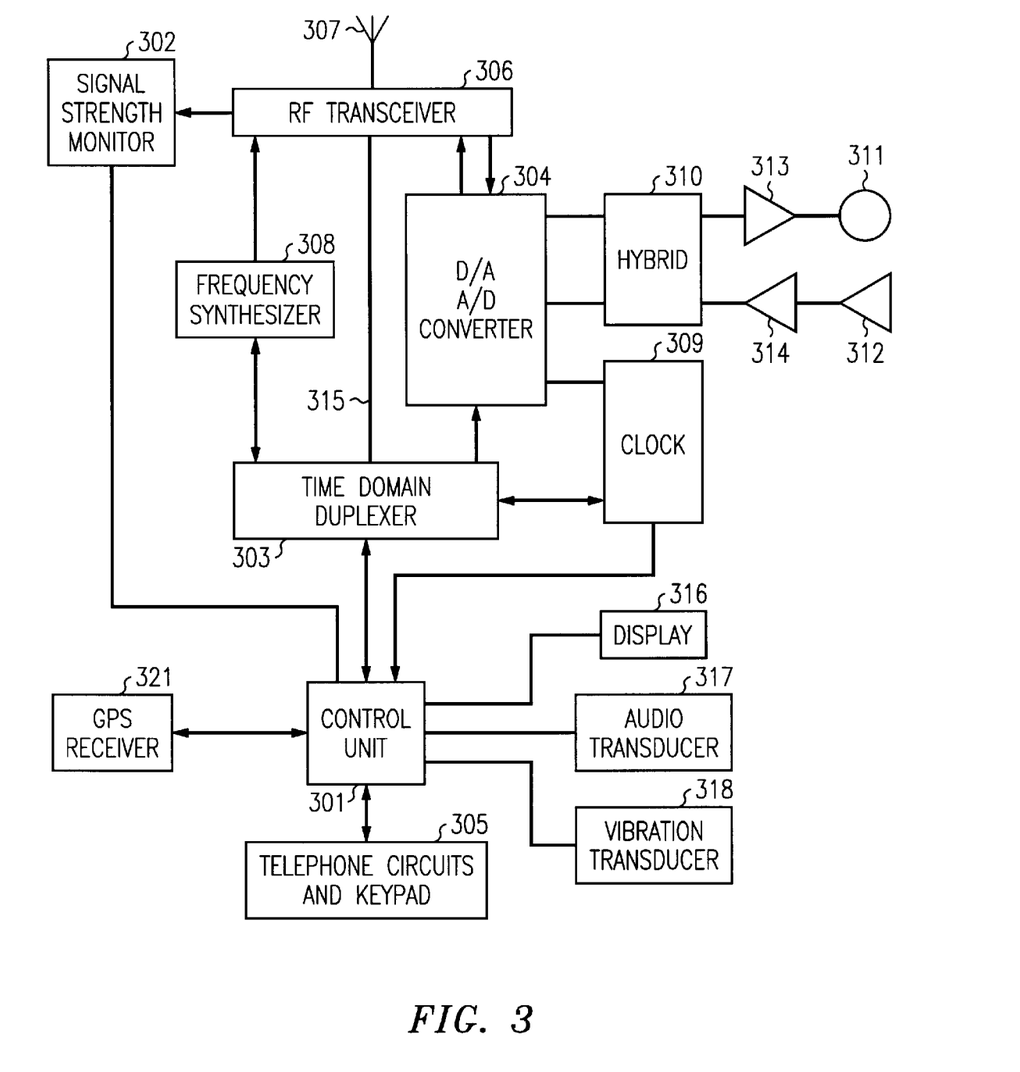
FIG. 3 illustrates, in block diagram form, a wireless handset.

Wireless handset 111 is illustrated in greater detail in FIG. 3. Other wireless handsets are identical in design. Wireless handset 111 implements a wireless protocol that allows wireless handset 111 to maintain a wireless signal link with system controller 112 via the base stations. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless handset is provided by control unit 301.

Units 302, 303, 306, 307, 308, and 309 provide the RF communication capabilities for the wireless handset. Elements 304, 310, and 311–314 provide the audio information received and transmitted to the user; whereas, elements 316–318 and 305 provide the basic user interface. GPS receiver 321 is a well known GPS receiver which utilizes a global positioning satellite to provide location coordinates of the wireless handset illustrated in FIG. 3. Utilizing control messages, processor 202 requests the coordinates from the wireless handset. Control unit 301 interrogates GPS receiver 321 for these coordinates and transmits the coordinates to processor 202 over the control channel that is established between control unit 301 and processor 202. GPS receiver 321 is only utilized in the third embodiment of the invention where the GPS coordinates are utilized to locate the wireless handsets of the telecommunication system.

Figure 4:
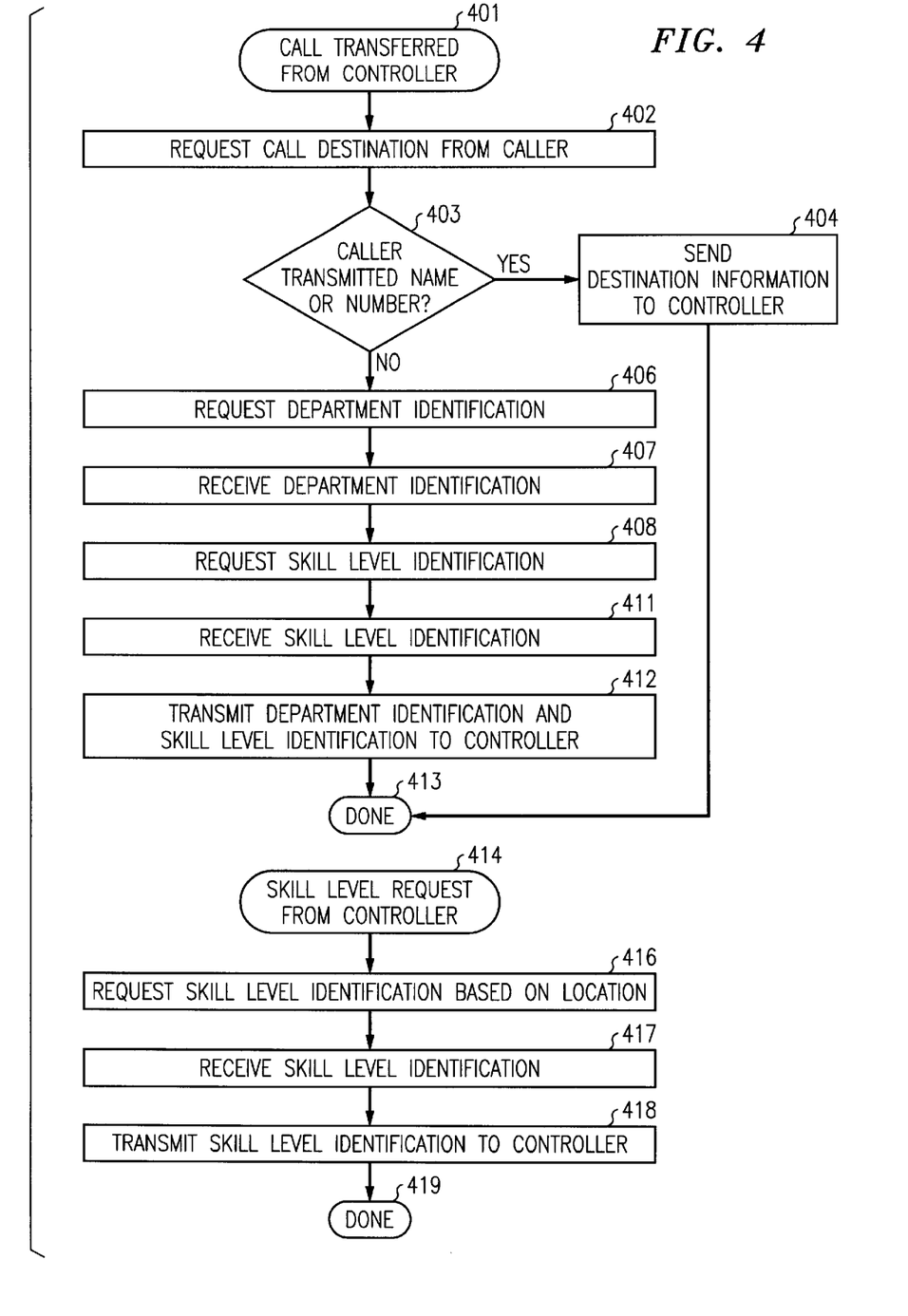
FIG. 4 illustrates, in flow chart form, the steps performed by attendant position 119.

As is well known in the art, attendant position 119 may be a human operator who performs the steps illustrated in FIG. 4 or may be an automated attendant position. An automated attendant position has a computer for performing the steps illustrated in FIG. 4 in a well known manner. An automated attendant position also has the capability of voice recognition and voice synthesis as well as the ability to receive multi-frequency dialing signals. In block 401 attendant position 119 receives a call transferred by system controller 112. Block 402 requests the destination of the call from the caller. The caller may supply this information by audio messages or by transmitting multi-frequency signals or digital data. Decision block 403 determines whether the caller transmitted a number or a name of the called party. If the answer is yes, block 404 sends this information defining the destination to system controller 112. If attendant position 119 received the name of the called person, attendant position 119 translates the name into the telephone number of the called party. After execution of block 404, control is transferred to block 413 which indicates that the operation is completed.

Returning to decision block 403, if the answer is no, block 406 requests the department identification from the caller. This request can be performed by a human operator asking a series of questions or can be performed by an automated attendant position using well known techniques. Block 407 receives the department identification information from the caller as either digital data or a spoken response. Block 408 then requests the skill level identification from the caller. In a retail setting, this would be done by asking the caller whether they simply want pricing information or need detailed expert assistance. Block 411 receives the skill level identification information from the caller. Block 412 then transmits the department identification and the skill level identification to system controller 112 in the form of a department and skill identification message. After execution of block 412, control is transferred to block 413 which indicates that the operation is completed. As will be described in greater detail with respect to FIG. 5, system controller 112 may send a request to attendant position 119 to interrogate a caller to determine the skill level that is necessary to help a caller. This occurs when the caller places a call from a help terminal. Block 414 receives the skill level request from system controller 112. Block 416 requests the skill level required based on the location of the help telephone which is received in the skill level request. Block 417 then receives the skill level indication. Finally, block 418 transmits the skill level indication to system controller 112 in a skill level identification message before transferring control to block 419.

FIGS. 5–8 illustrate the steps performed by system controller 112. After the operations are initially started in block 501, decision block 502 determines whether it is time to determine the locations of the wireless terminals. This determination is performed on a periodical basis. If the answer is no, decision block 503 determines if a message has been received from attendant position 119. If the answer in decision block 503 is no, decision block 504 determines if an incoming call is being received to system controller 112 either from a terminal attached to system controller 112 or from public network 118 as illustrated in FIG. 2. If it is not an incoming call, then it is a maintenance operation, etc. which is handled by block 506. After execution of block 506, control is transferred back to decision block 502.

Figure 5:
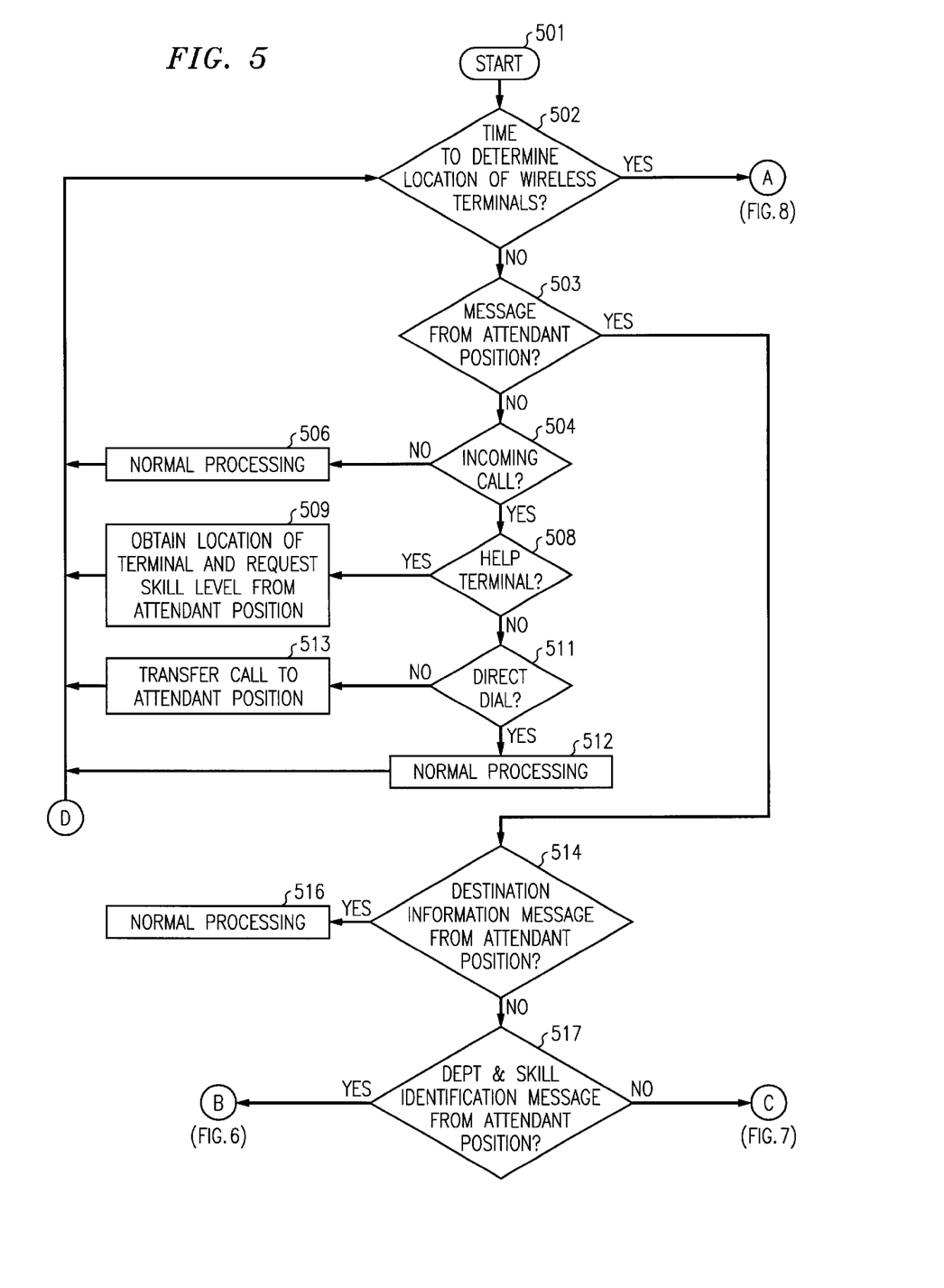
FIGS. 5, 6, 7, and 8 illustrate, in flow chart form, the steps performed by system controller 112.

If the answer in decision block 504 is yes, decision block 508 determines if the call is from a help terminal connected to system controller 112. If the answer is yes, block 509 accesses internally stored table to determine the location of the help terminal and transmits a request to attendant position 119 specifying the location of the help terminal and that the skill level be base on that particular location. After execution of block 509, control is transferred back to decision block 502.

Returning to decision block 508, if the answer is no, decision block 511 determines whether the incoming call is a direct dialed call. A direct dialed call is one which specifies the extension to which the call is to terminate. If the answer is yes, control is transferred to block 512 for the normal processing of an incoming call to a dialed extension. Returning to decision block 511, if the call was not directly dialed, control is transferred to block 513 which transfers the call to attendant position 119.

Returning to decision block 503, if a message has arrived from attendant position 119, control is transferred to decision block 514 which determines if the message is a destination information message transmitted by block 404 of FIG. 4. If the answer is yes, control is transferred to block 516 which performs normal call processing since the destination information message specifies the extension to which an incoming call is to be directed.

Returning to decision block 514, if the answer is no, control is transferred to decision block 517 which determines if a department and skill identification message has been received from attendant position 119. Such a message would have been transmitted by block 412 of FIG. 4. If the answer in decision block 517 is yes, control is transferred to decision block 601 of FIG. 6. Based on the skill level transmitted in the department and skill identification message, decision block 601 determines if a call coverage group should be utilized to determine to which wireless terminal the call should be transferred. For example, in a hospital, if the incoming call was requesting information concerning the medical condition of a patient, then a call coverage group consisting of nurses who had access to the patient would be selected. The first entry into this call coverage group would be the primary nurse for the patient.

Figure 6:
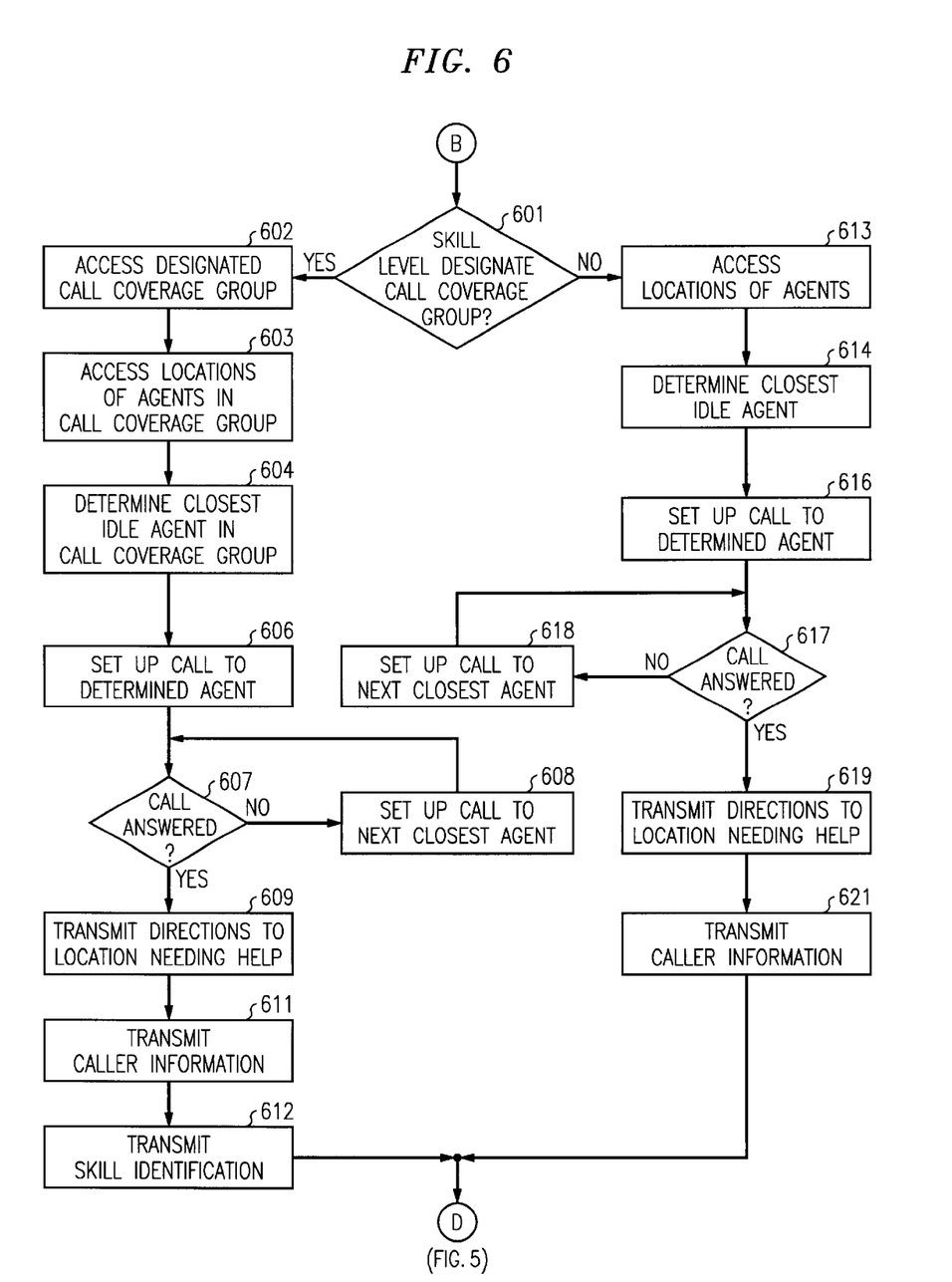

If no particular skill level was required to handle the incoming call concerning a patient, the call would simply be transferred to a call coverage group that handled routine general information for the hospital. Within a retail operation, if the skill level required somebody experienced in plumbing, then employees in a plumbing call coverage group help the caller. If on the other hand the caller simply wants a price check, then any employee/agent that is in the vicinity of the plumbing department is eligible to receive the call. One skilled in the art could readily envision more than one call coverage group could be selected in decision block 601.

If the answer in decision block 601 is yes, block 602 accesses the designated call coverage. Block 603 accesses the locations of the agents in the call coverage group, and block 604 determines the closest idle agent in the call coverage group. Block 606 then sets up a call to the determined agent. Decision block 607 determines if the call has been answered. If the call is not answered within a reasonable amount of time, block 608 accesses the call coverage group, selects the next closest agent, and sets up a call to that agent before returning control back to decision block 607. Once an agent answers the call, decision block 607 transfers control to block 609. Block 609 transmits directions to the location needing help which may only be to designate a department or may designate a particular room. Block 611 transmits caller information. In the hospital example, the caller information briefly describes the condition of the patient and the type of information that is needed. Finally, block 612 transmits the type of skill that is being required by the caller. For example, within a retail store a particular employee may be well versed in plumbing and electrical problems, and it is convenient for the employee to know which of those skills the caller needed help. After execution of block 612, control is transferred back to decision block 502 of FIG. 5.

Returning to decision block 601, if no particular skill is required thus requiring a particular call coverage group, control is transferred to block 613 which accesses the locations of all agents. Block 614 determines the closest agent, and block 616 sets up a call to the determined agent before transferring control to decision block 617. The latter decision block determines when the call is answered. If the call is not answered, block 618 sets up a call to the next closest agent before returning control to decision block 617. Once decision block 617 determines that a call has been answered, control is transferred to block 619. Block 619 transmits directions to the location needing help, and block 621 transmits caller information to the agent before transferring control back to decision block 502 of FIG. 5.

Figure 7:
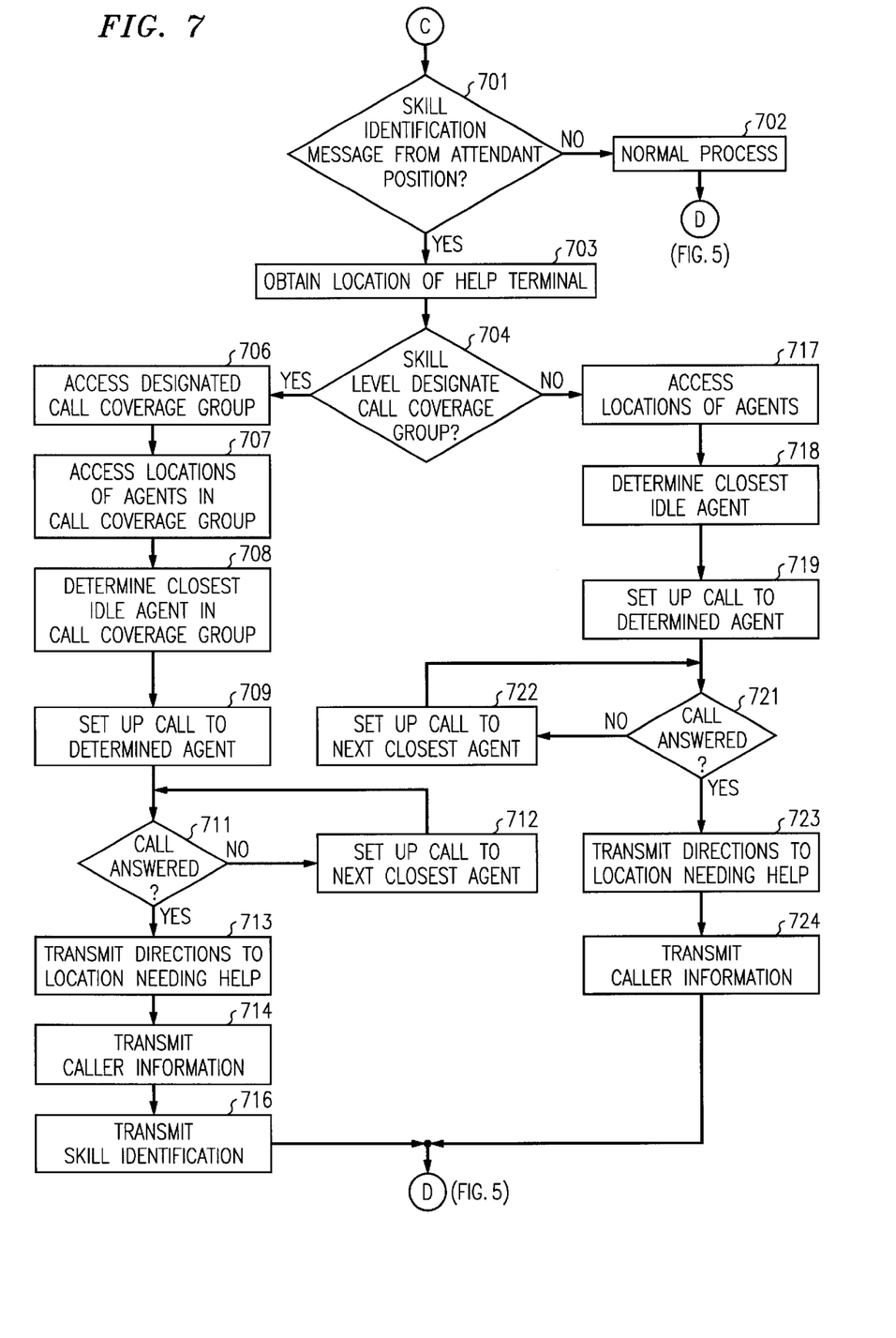

Returning to decision block 517 of FIG. 5, if the message received from attendant position 119 is not a department and skill identification message, control is transferred to decision block 701 of FIG. 7. Decision block 701 determines if a skill identification message was received from attendant position 119. Such a message is transmitted by block 418 of FIG. 4. If the answer is no, then the receive message is a maintenance, etc. message and is handled by block 702 before control is transferred back to decision block 502 of FIG. 5. If the answer in decision block 701 is yes, control is transferred to block 703 which obtains the location of the help terminal that is being utilized by the caller to place the incoming call to system controller 112. Decision block 704 utilizes the skill identification message received from attendant position 119 and the location information of the help terminal received in block 703 to determine if a skill level is present that designates a call coverage group. If the answer in decision block 704 is yes, blocks 706–716 are executed which are similar in operation to blocks 602–612 of FIG. 6. If the answer in decision block 704 is no, blocks 717–724 are executed which are similar in operation to blocks 613–621 of FIG. 6. After execution of either block 716 or block 724, control is transferred back to decision block 502 of FIG. 5.

Figure 8:
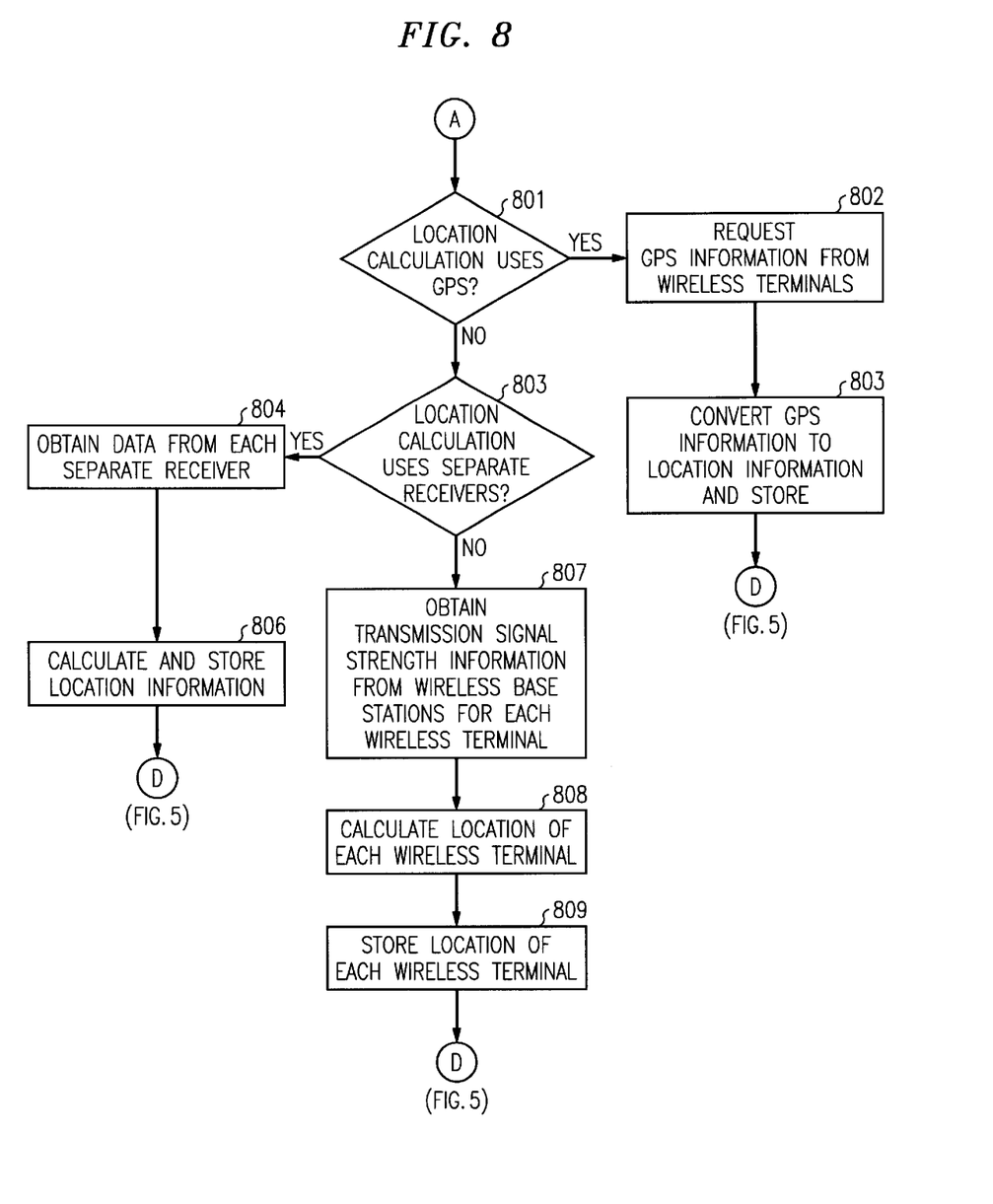

Returning to decision block 502 of FIG. 5, if it is time to determine the location of the wireless terminals, control is transferred to decision block 801 of FIG. 8. FIG. 8 illustrates the operations that are performed for one of three different mechanisms for determining the locations of the wireless terminals. Normally, only one of these methods is employed at any time by system controller 112. Decision block 801 determines if a global positioning satellite is being utilized to determine the positions of the wireless terminals. If the answer is yes, control is transferred to block 802. If GPS is being utilized to determine the locations of the wireless terminals, then each wireless terminal must have GPS receiver 321 of FIG. 3. Block 802 requests the GPS information from each of the wireless terminals. System controller 112 performs this operation by individually requesting the GPS information from each of the wireless terminals. The GPS information is given in terms of longitude and latitude. Block 803 converts this GPS information to location information which defines where in the physical facility serviced by the telecommunication system of FIG. 2 the wireless terminal is located. Block 803 also stores the location information. After execution of block 803, control is transferred to decision block 502 of FIG. 5.

Returning to decision block 801, if the locations are not being calculated based on GPS information, control is transferred to decision block 803 which determines if the method set forth in U.S. Pat. No. 5,327,144 is being utilized to determine the location of the wireless terminals. If the answer is yes, control is transferred to block 804 which obtains the information from each individual base station gathered by the attached signal strength receiver such as signal strength receiver 224. After execution of block 804, block 806 calculates and stores the location information before transferring control back to decision block 502 of FIG. 5.

Returning to decision block 803, if the answer is no, then the signal strength determined by the radio units of the base stations is utilized to calculate the positions of the wireless terminals using the well known techniques of triangulation by utilizing the measurements of the three radio units each in a separate base station receiving the strongest signal from each of the wireless terminals. These calculations are performed by block 807 first obtaining the signal strength information from the base stations, and block 808 performing the actual calculations. The results of the calculations in block 808 are stored by block 809 before transferring control back to decision block 502 of FIG. 5. One skilled in the art could readily envision other methods of determining the locations of the wireless terminals.

Of course, various changes and modifications to the illustrative embodiments described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. A method of selecting one of a plurality of agents to process a telecommunication call in a telecommunication switching system having a plurality of wireless terminals, comprising the steps of:

identifying information being requested by a caller of the telecommunication call where the information relates to a physical item;

identifying a physical location of the physical item to obtain the identified information; and transferring the telecommunication call to one of the plurality of wireless terminals used by one of a plurality of agents in close proximity to the identified location.

2. The method of claim 1 further comprises the step of identifying a skill level for providing the identified information; and the step of transferring comprises the step of selecting the one of the plurality of agents using the identified skill level and identified location.

3. The method of claim 2 wherein the step of transferring further comprises the step of determining location of each of the plurality of wireless terminals.

4. The method of claim 3 wherein the telecommunication switching system having a controller and the step of determining comprises the steps of receiving reference information by the controller; and calculating the location of each of the plurality of wireless terminals from the reference information.

5. The method of claim 4 wherein the received reference information defines the transmission strength of each of the plurality of wireless terminals.

6. The method of claim 5 wherein the telecommunication switching system having a plurality of wireless base stations and the step of receiving the reference information comprises the step of transmitting the reference information by the plurality of wireless base stations to the controller.

7. The method of claim 3 wherein the telecommunication call is from one of a plurality of fixed terminals connected to telecommunication switching system and the step of determining the location comprises the step of accessing data to determine the location of the one of the plurality of fixed terminals.

8. The method of claim 2 wherein the step of selecting comprises the step of designating one of a plurality of call coverage paths from which to select the one of the plurality of agents.

9. The method of claim 8 wherein the step of transferring further comprises the step of determining location of each of the plurality of wireless terminals.

10. The method of claim 9 wherein the telecommunication switching system having a controller and the step of determining comprises the steps of receiving reference information by the controller; and calculating the location of each of the plurality of wireless terminals from the reference information.

11. The method of claim 10 wherein the received reference information defines the transmission strength of each of the plurality of wireless terminals.

12. The method of claim 11 wherein the telecommunication switching system having a plurality of wireless base stations and the step of receiving the reference information comprises the step of transmitting the reference information by the plurality of wireless base stations to the controller.

13. The method of claim 9 wherein the telecommunication call is from one of a plurality of fixed terminals connected to telecommunication switching system and the step of determining the location comprises the step of accessing data to determine the location of the one of the plurality of fixed terminals.

14. The method of claim 10 or 13 further comprises the step of transmitting location identification information defining the location of the physical item to the one of the plurality of wireless terminals.

15. The method of claim 14 wherein the location identification information is transmitted as an audio messages.

16. The method of claim 15 wherein the location identification information is transmitted as a data message and is displayed on the one of the plurality of wireless terminals.

17. The method of claim 1 further comprises the step of transmitting location identification information defining the location of the physical item to the one of the plurality of wireless terminals.

18. The method of claim 17 wherein the location identification information is transmitted as an audio messages.

19. The method of claim 18 wherein the location identification information is transmitted as a data message and is displayed on the one of the plurality of wireless terminals.

* * * * *